United States Patent [19]

Minoura

[11] Patent Number: 5,395,016
[45] Date of Patent: Mar. 7, 1995

[54] SHACKLE LOCK HOLDER

[75] Inventor: Koji Minoura, Gifu, Japan

[73] Assignee: Minoura Co., Ltd., Gifu, Japan

[21] Appl. No.: 78,445

[22] Filed: Jun. 16, 1993

[30] Foreign Application Priority Data

Apr. 15, 1993 [JP] Japan ................................. 5-088896

[51] Int. Cl.⁶ ............................................... B62J 7/00
[52] U.S. Cl. ..................................... 224/39; 224/42; 224/41
[58] Field of Search .................. 224/39, 42, 41, 38, 224/37, 32 A, 42.45 R, 277, 281, 282, 42.03 B, 916, 917, 320; 211/4, 5; 248/314, 316.2, 316.3; 70/14, 18, 58, 233, 234; 280/754, 769, 11.31, 11.32

[56] References Cited

U.S. PATENT DOCUMENTS

| 3,202,434 | 8/1965 | Goodman | 280/11.31 |
| 3,870,210 | 3/1975 | Trammell, Jr. | 224/42.45 R |
| 5,127,562 | 7/1992 | Zane et al. | 224/39 |
| 5,138,901 | 8/1992 | Dabandjian et al. | 70/233 X |
| 5,226,341 | 7/1993 | Shores | 70/223 X |
| 5,251,796 | 10/1993 | Shelhart | 224/39 |

FOREIGN PATENT DOCUMENTS

| 184071 | 12/1953 | Austria | 224/38 |
| 0079798 | 5/1983 | European Pat. Off. | |
| 5105001 | 4/1993 | Japan | 224/281 |

OTHER PUBLICATIONS

Ming Tay Hardware Industrial Co., Ltd., Bicycle Today pp. 703–704 (no date).
Cyclelok, Yamaha (no date).
Cyclelok, Motorcycle Theft Protection (no date).
Abus Color, I colori della natrua negli antifurti+soluzioni di trasporto (no date).
Cyclelok (no date).
Sicherheit Trelock, Trelock: Integrierte Losungen, trager 330. (no date).

Primary Examiner—Henry J. Recla
Assistant Examiner—David J. Walczak
Attorney, Agent, or Firm—Fulwider Patton Lee & Utecht

[57] ABSTRACT

A shackle lock holder is provided. A support is attached to a stay of a load-carrying platform of a bicycle. The support includes an unmovable member and slider which engage both ends of a U-shaped shackle for holding a shackle lock. The member is secured to the support. The slider is slidable along the support, and urged toward the member by the force of a spring. The slider includes a through hole through which one end portion of the shackle is inserted.

11 Claims, 7 Drawing Sheets

SHACKLE LOCK HOLDER

BACKGROUND OF THE INVENTION

1. Field of the Invention

The present invention relates to a holder for a shackle lock. More specifically, the present invention relates to a holder securing a shackle lock, which locks a wheel of a bicycle, a motorbike, etc., to the vehicle, when the shackle lock is not in use.

2. Description of the Related Art

A shackle lock is employed as locking means for preventing a bicycle, etc., from being stolen. The shackle lock is formed by a shackle having a U-shape and a lock bar for joining ends of the shackle. When the ends of the shackle are inserted into holes formed in the lock bar, the shackle is locked by the lock bar so as to fasten the bicycle to an installed equipment. The shackle and lock bar can be separated for unlocking.

Figure 6:
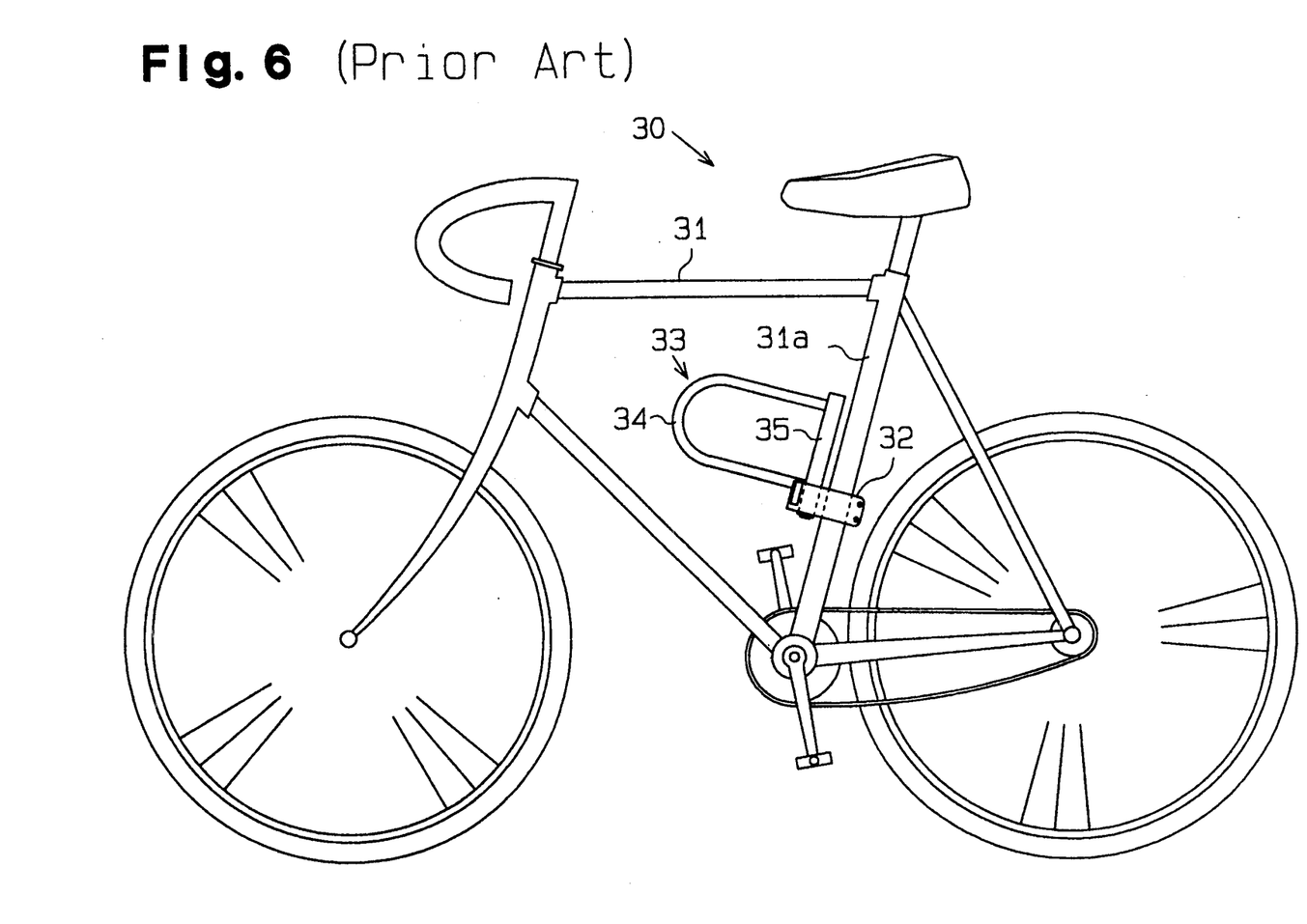
FIG. 6 is a front view showing a conventional shackle lock mounted to a bicycle.
Figure 7:
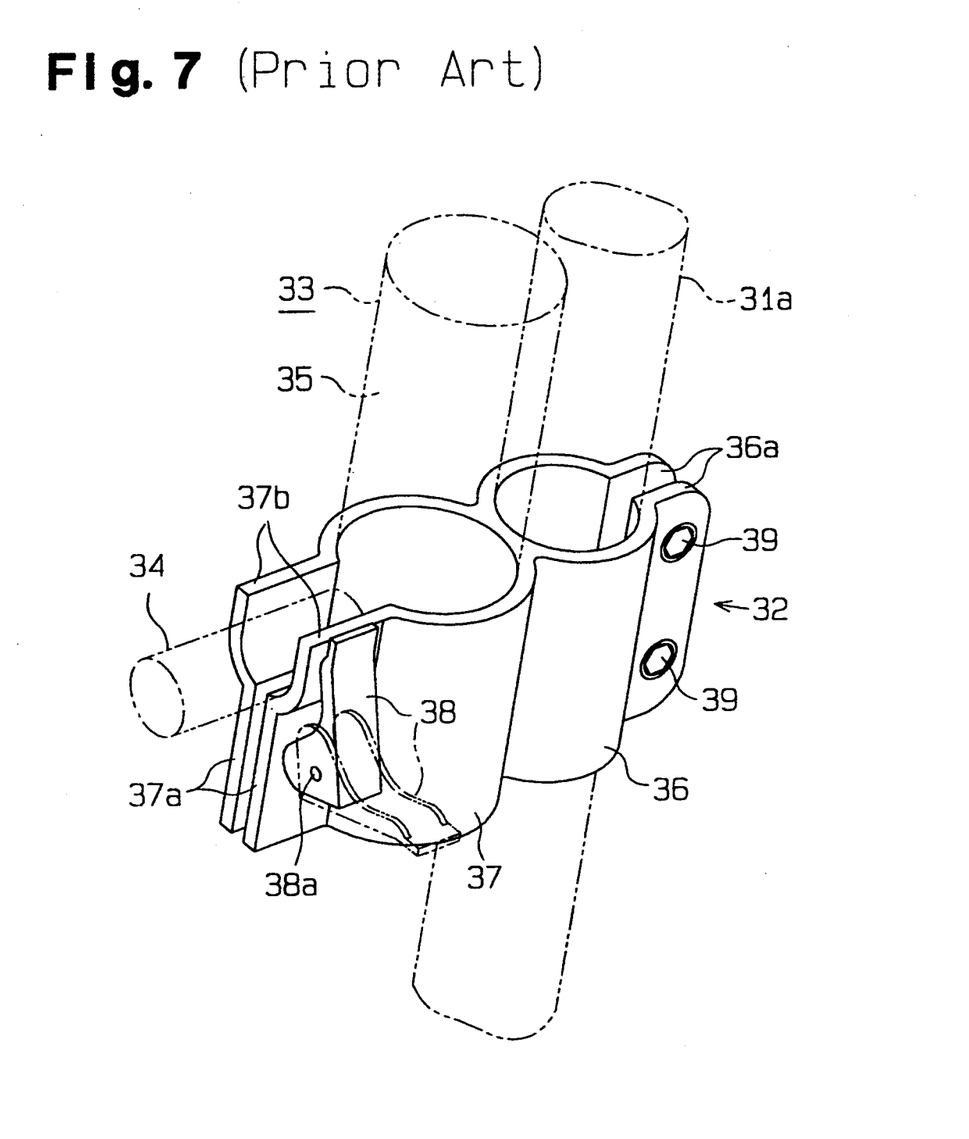
FIG. 7 is a perspective view of the conventional shackle lock.

FIGS. 6 and 7 show a holder 32 for holding a shackle lock which is not in use. The holder 32 is mounted to a vertical pipe 31a of a bicycle frame 31. The holder 32 is made of an elastic resin material. As shown in FIG. 7, the holder 32 includes a pipe fastener 36 and a clamp 37. Two opposed protrusions 36a are formed at the outside of the fastener 36.

The fastener 36 opened by splitting the both protrusions 36a, can be mounted on a vertical pipe 31a. After the fastener 36 is mounted on the pipe 31a, the protrusions 36a are fastened to each other by a pair of bolts 39, such that a holder 32 is secured to the pipe 31a. A pair of protruding plates 37a is formed at the outside of the clamp 37. A clamp 37b for seizing an end a shackle 34 extends outwardly from the top of each plate 37a. A lever 38 is rotatably mounted to the plate 37a by way of the pins 38a. When the lever 38 is rotated to the position indicated by a double dotted line to release the binding of the plates 37a, an end of a lock bar 35 joined with the shackle 34 is inserted into the clamp 37. The end of the shackle 34 is positioned within the clamp 37b. Subsequently, the lever 38 is rotated to the position indicated by the solid line for tightly fastening the plates 37a each other. Therefore, a shackle lock 33 is secured to the holder 32.

However, the holder 32 is elastically deformable. The end of the shackle lock 33 is secured to the holder, such that the holder 32 supports entire weight of shackle lock 33. Therefore, securing condition of the shackle lock 33 becomes loose which is caused by vibration, etc., generated while the bicycle is running. Thus, there is a fear that the shackle lock 33 may fall out from the holder 32. The length of the frame pipe 31a may differ according to a type of bicycle. There is a drawback that the pipe 31a may be too short to attach the holder 32.

The holder 32 permits the the lock 33 to be released by manipulating the lever 38, such that the lock 33 can be removed from the holder 32. Therefore, there is a problem that the lock 33 may be stolen when the shackle lock 33 is not in use.

SUMMARY OF THE INVENTION

Accordingly, it is a primary object of the present invention to provide a shackle lock holder which can securely hold a shackle lock to a bicycle when not in use.

Another object of the present invention is to provide a shackle lock holder which can securely hold a shackle lock without becoming loose while the bicycle is running with the shackle lock not in use attached thereto.

To achieve the above-described objects, the present invention discloses a holder for securing a shackle lock to a vehicle, wherein the shackle lock includes a U-shaped shackle and a lock bar connected to ends of shackle for keeping the shackle lock in the locking situation. The holder comprises a support for supporting the shackle, said support being mounted to the vehicle and holding means attached to said support and engaging the ends of the shackle for holding the shackle lock on the vehicle.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings, in which:

DETAILED DESCRIPTION OF THE PREFERRED EMBODIMENT

A preferred embodiment according to the present invention will now be described referring to FIGS. 1 through 5.

Figure 1:
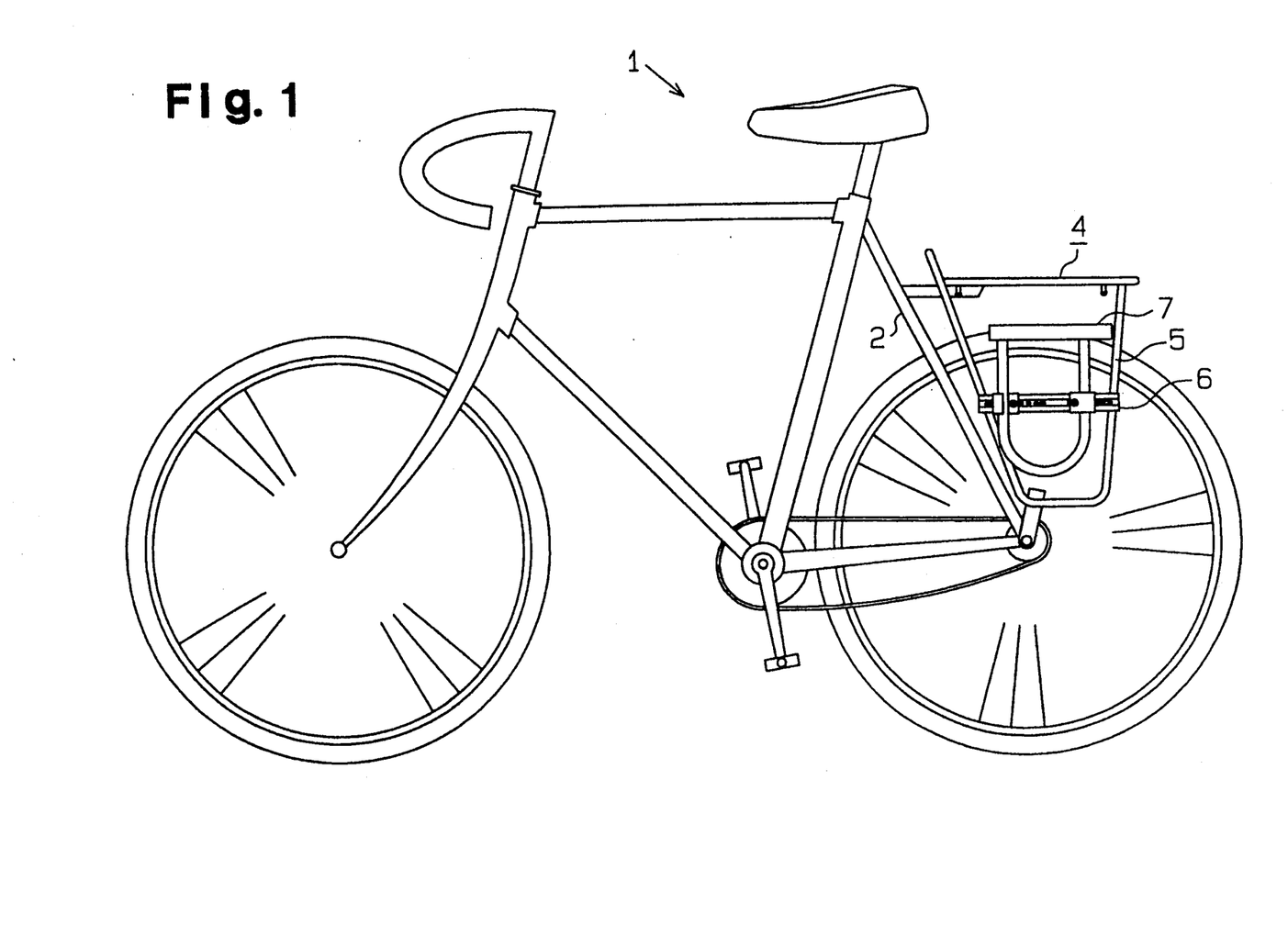
FIG. 1 is a front view showing a shackle lock holder mounted to a load-carrying platform of a bicycle.

As shown in FIG. 1, a load-carrying platform 4 is secured to a seat stay 2 of a bicycle 1. A shackle lock holder 6 is mounted to a stay 5 of the platform 4.

Figure 2:
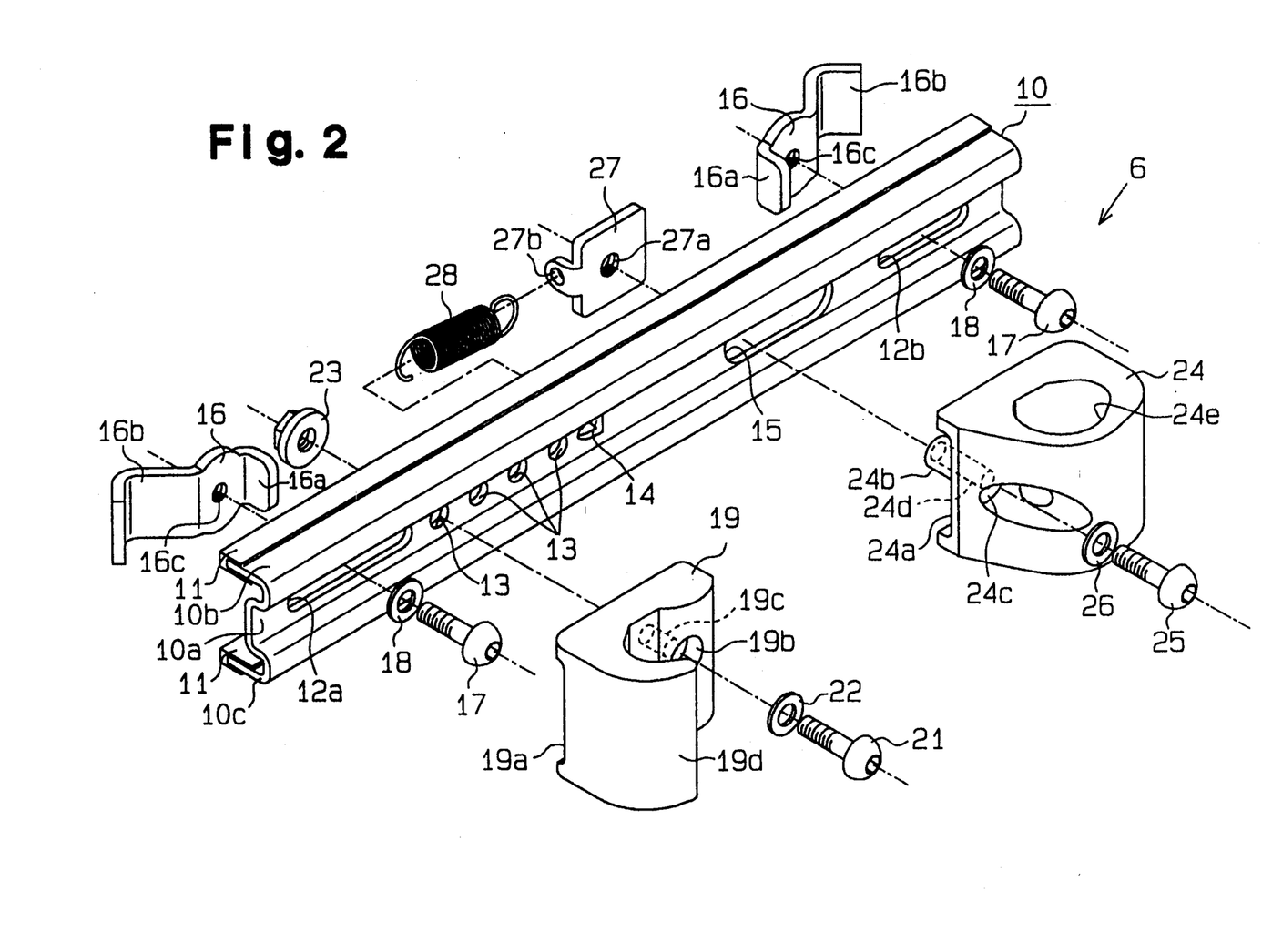
FIG. 2 is a disassembled perspective view of the shackle lock holder.

FIG. 2 illustrates a support 10 of the holder 6 made of aluminum alloy having an elongated plate shape with a rather narrow width. The support 10 includes a base 10a at the central portion of the support 10. A pair of reinforcing ribs 10b, 10c which are formed at the top and bottom portions of the base 10a and extend in parallel, respectively. The ribs 10b, 10c act as guide rails, respectively. Cushions 11 made of an elastic resin material are mounted to the elongated edges of the ribs 10b, 10c, respectively.

Elongated apertures 12a, 12b are formed at the end of the base 10a. A plurality of attaching holes 13 are formed in the vicinity of the aperture 12a. A hook 14 for hooking a spring extends toward the rear side of the substantially middle of the base 10a. An elongated guide aperture 15 is formed in the vicinity of the opening 12b along the longitudinal direction of the base 10a.

Grippers 16 made of a metal material are provided with the back side (the left side in FIG. 2) of the support 10, which correspond to the elongated apertures 12a and 12b, respectively. Each gripper 16 includes a portion 16a, at its inner distal end, which abuts against the back surface of the base 10a. Each gripper 16 further includes a pressing portion 16b formed at its outer end.

Figure 3:
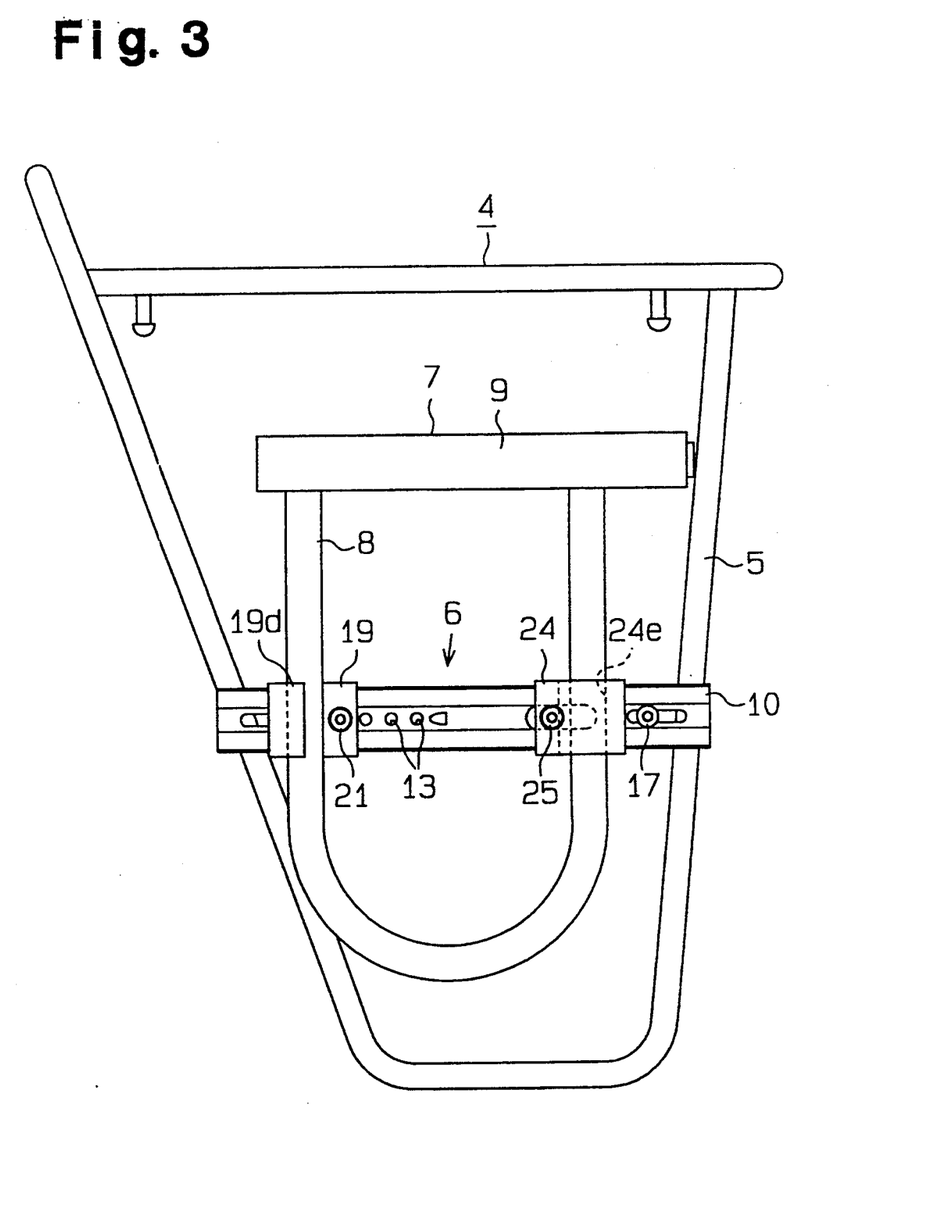
FIG. 3 is an enlarged front view of the shackle lock holder.
Figure 4:
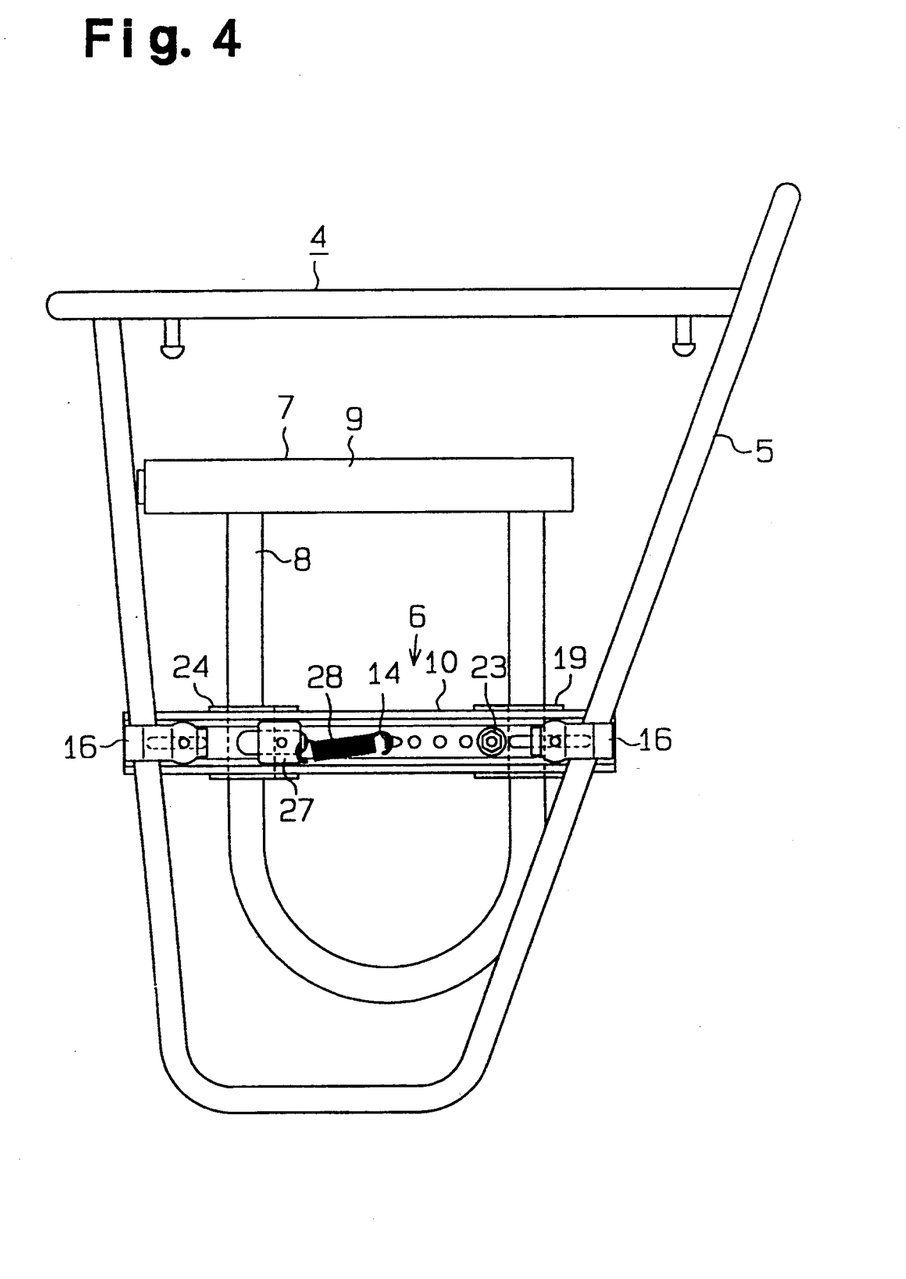
FIG. 4 is an enlarged back view of the shackle lock holder.

The portions 16b cooperate with the support 10 for securing the ends of the support 10 to the stay 5. The support 10 secured to the stay 5 accommodated within the portions 16b by bolts 17 inserted through the elongated apertures 12a, 12b and screwed into holes 16c, respectively, as shown in FIG. 3. Returning to FIG. 2, washers 18 are disposed between the bolts 17 and base 10a, respectively. When the support 10 is to be mounted to the ribs 10b, 10c, the ribs will not damage the stay 5 owing to the cushions 11 attached to the ribs 10b, 10c.

As shown in FIG. 3, an unmovable member 19 made of a rigid resin material is secured at the left end of the support 10. As shown in FIG. 2, the member 19 includes a groove 19a which is formed with the bottom surface facing the support 10, for receiving both of the ribs 10b, 10c. A guide hole 19c is formed at the central portion of a recess 19b provided with the member 19. A bolt 21 is inserted into the guide hole 19c and attaching hole 13. A nut 23 is mounted on the bolt 21 at the back side of the support 10. Therefore, the member 19 is secured to the support 10. As the inner wall of the groove 19a engages with the support 10, the member 19 is prevented from rotating. A washer 22 is provided between the bolt 21 and the recess 19b. The left end of the member 19 is turned inwardly to form a bow shaped receiving portion 19d. A vertical portion of the shackle 8 (left side in FIG. 3) is fitted into the portion 19d.

As shown in FIG. 3, a slider 24 made of a rigid resin material is slidably mounted to the end of the support 10. As shown in FIG. 2, the slider includes a guide groove 24a formed with the surface opposed to the support 10 so as to receive both of the ribs 10b, 10c. A cylindrical portion 24b formed with the bottom surface of the guide groove 24a can be inserted through the guide aperture 15. When the guide groove 24a receives the ribs 10b, 10c, the cylindrical portion 25b sightly protrudes beyond the back side of the base 10a. The outer diameter of the cylindrical portion 25b is slightly smaller than the vertical width of the guide aperture 15.

The member 24 includes a recess 24c formed at the position corresponding to the cylindrical portion 24b. A bolt 25 is inserted into the portion 24b and inserted into a bore 27a of a supporting piece 27 disposed at the back side of the support 10. Therefore, the slider 24 and supporting piece 27 are secured to each other. In this configuration, a narrow gap is defined between the slider 24 and the supporting piece 27 by the presence of the cylindrical portion 24b. Therefore, the slider 24 and the piece 27 can be slid within the length of the guide aperture 15 along the ribs 10b, 10c. The engagement of the guide groove 24a with the support 10 prevents the slider 24 from rotating. A washer 26 is disposed between the bolt 25 and the recess 24c.

A through hole 24e is vertically formed with the slider 24. The right portion of the shackle 8 (i.e., FIG. 3) is inserted into the hole 24e to be secured.

A hook is formed with the supporting piece 27. A tensile spring 28 is suspended between the hooks 14, 27b. The slider 24 together with supporting piece 27 are urged toward the member 19 by force of the spring 28.

The shackle lock 7 is mounted to the holder 6 in the following manner.

When the bicycle 1 is fixed to the installation by means of the shackle lock 7, the shackle 8 and a lock bar 9 are split by unlocking by the key. The right end portion of the shackle 8 is inserted into the through hole 24e as shown in FIG. 3.

Figure 5:
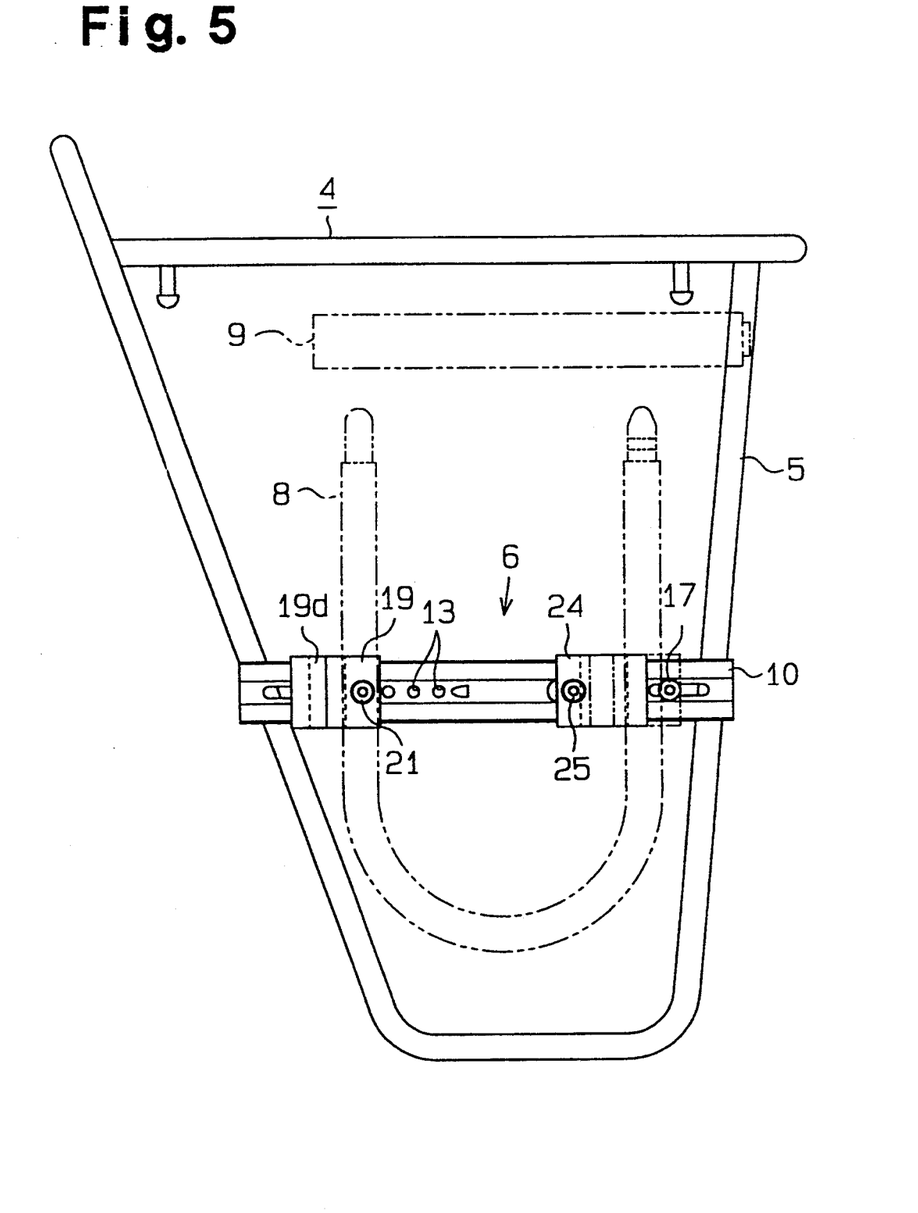
FIG. 5 is a front view showing the shackle lock which is carried by the holder.

As the right end of the shackle 8 is gripped by a user and the shackle 8 is pulled together with the slider 24 to the right in FIG. 5 against the force of the spring 28, the slider 24 slides in the right direction along the support 10. The slider 24 is slid until the left end portion of the shackle 8 comes beyond the right side of the portion 19d of the member 19.

As the shackle 8 is being pulled, the shackle 8 is rotated about the through hole 24e, and the left end of the shackle 8 is fitted into the portion 19d. Then, as the pulling tension is reduced, the shackle 8 together with the slider 24 are slid toward the fixed member 19 along the support 10 by the force of the spring 28, and the left end portion of the shackle 8 is fitted into the portion 19d.

In this condition, as the shackle 8 is released by the user the slider 24 is urged toward the member 19 with the aid of the spring 28. As a result, the shackle 8 is securely held between the member 19 and the slider 24.

After the ends of the shackle 8 are inserted into connecting bores of the lock bar 9 respectively, the shackle 8 and the lock bar 9 are securely locked each other by the turning a key in the locking direction. Therefore, as the shackle 8 and the lock bar 9 are connected each other, the shackle lock 7 is securely held to the holder 6.

When the shackle lock 7 is to be removed from the holder 6, the reverse operation with respect to the above is to be carried out.

In the holder 6 according to this embodiment, the member 19 and the slider 24 which are provided in the support 10 are fitted into the ends of the shackle 8, respectively. Therefore, the shackle lock 7 will not fall out of the moving bicycle 1 as the shackle lock 7 is secured to the bicycle 1.

Further, according to this embodiment, as the tensile spring is provided, the slider 24 is slid to the member 19 so as to secure the shackle 8. Therefore, rattling of the shackle lock 7 is prevented even when the vibration is applied thereon while the bicycle 1 is being ridden.

According to this embodiment, the through hole 24e is formed in the slider 24, the inner periphery of which engages the end of the shackle 8 inserted therethrough. This configuration prevents the shackle lock 7 from being removed from the bicycle, resulting in keeping the shackle lock 7 safe from the thief.

Further, according to this embodiment, a plurality of attaching holes 13 are provided in the support 10. When the member 19 is to be secured, any one of the holes 13 is preferably selected. Therefore, the holder 6 can hold different types of shackle lock 7 having various spacings between the ends of the shackle 8, respectively.

Although only one embodiment of the present invention has been described herein, it should be apparent to those skilled in the art that the present invention may be embodied in many other specific forms without departing from the spirit or scope of the invention. Particularly, it should be understood that the holder 6 can be attached at any arbitrary location in a bicycle where the support 10 can be attached. Further, the holder 6 for a shackle lock can be employed in motor cycles apart from the bicycle.

What is claimed is:

1. A holder for securing a shackle lock to a vehicle, said shackle lock being capable of fixing the vehicle to an installation when the shackle lock is in a locking configuration, wherein the shackle lock includes a U-shaped shackle having first and second ends and a lock bar connected to the first and second ends of the shackle for keeping the shackle lock in the locking configuration, said holder comprising:
- a support for supporting the shackle, said support being adapted to be mounted to the vehicle, said support including a pair of elongated apertures for receiving bolts, and a pair of grippers for mounting the support to the vehicle by means of the bolts inserted into the elongated apertures, said grippers being movably mounted to the support;
- a first engaging member secured to the support;
- a second engaging member slidable in the longitudinal direction of the support and for holding the shackle lock in cooperation with the first engaging member, said first and second engaging members engaging the side portions of the shackle lock on the vehicle; and
- an urging means for urging the second engaging member toward the first engaging member.

2. A holder according to claim 1 further including:
- a guide aperture formed in said support;
- a cylindrical portion formed in said second engaging member, and inserted through said guide aperture; and
- a supporting piece opposing the second engaging member via said support and connected with the cylindrical portion, said supporting piece being slidable along said support.

3. A holder according to claim 2 further including a pair of ribs formed with the support, said ribs being received in a groove formed in the first engaging member and in a groove in the second engaging member.

4. A holder according to claim 2 further including;
- a receiving portion formed with the first engaging portion, said receiving portion extending to the second engaging member; and
- a through hole formed with the second engaging member, said hole allowing the shackle to be inserted.

5. A holder according to claim 4, wherein said spring is hooked between a hook formed in said support and said supporting piece.

6. A holder for securing a shackle lock to a vehicle, said shackle lock capable of fixing the vehicle to an installation when the shackle lock is in a locking configuration, wherein the shackle includes a U-shaped shackle having first and second ends and a lock bar connected to the ends of the shackle for keeping the shackle lock in the locking configuration, said holder comprising:
- a support for supporting the shackle, said support being adapted to be mounted to the vehicle;
- a first engaging member secured to the support;
- a second engaging member slidable along the support and for holding the shackle lock in cooperation with the first engaging member;
- urging means for biasing the second engaging member to an urging position;
- a guide aperture formed in the support;
- a cylindrical portion formed in said second engaging member, and inserted through said guide aperture; and
- a supporting piece opposing the second engaging member via said support and connected with the cylindrical portion, said supporting piece being slidable along said support.

7. A holder according to claim 6, wherein said support includes:
- a pair of elongated apertures for receiving bolts; and
- a pair of grippers for mounting the support to the vehicle by means of the bolts inserted into the elongated aperture, said grippers being movably mounted to the support.

8. A holder according to claim 6, wherein said support includes a plurality of attaching holes for receiving bolts which secure said first engaging member to the support.

9. A holder according to claim 6 further including a pair of ribs formed with the support, said ribs being received in a groove formed in the first engaging member and in a groove in the second engaging member.

10. A holder according to claim 6 further including:
- a receiving portion formed with the first engaging portion, said receiving portion extending to the second engaging member,
- a through hole formed with the second engaging member, said hole allowing the shackles to be inserted; and
- said urging means including a spring which urges the second engaging member toward the first engaging member.

11. A holder according to claim 10, wherein said spring is hooked between a hook formed in said support and said supporting piece.

* * * * *